United States Patent
Xiao et al.

(10) Patent No.: US 12,475,915 B2
(45) Date of Patent: Nov. 18, 2025

(54) VOICE ACTIVITY DETECTION METHOD AND SYSTEM, AND VOICE ENHANCEMENT METHOD AND SYSTEM

(71) Applicant: Shenzhen Shokz Co., Ltd., Shenzhen (CN)

(72) Inventors: Le Xiao, Shenzhen (CN); Chengqian Zhang, Shenzhen (CN); Fengyun Liao, Shenzhen (CN); Xin Qi, Shenzhen (CN)

(73) Assignee: Shenzhen Shokz Co., Ltd., Shenzhen (CN)

( * ) Notice: Subject to any disclaimer, the term of this patent is extended or adjusted under 35 U.S.C. 154(b) by 230 days.

(21) Appl. No.: 18/370,387

(22) Filed: Sep. 19, 2023

(65) Prior Publication Data
US 2024/0038257 A1 Feb. 1, 2024

Related U.S. Application Data

(63) Continuation of application No. PCT/CN2021/139747, filed on Dec. 20, 2021.

(51) Int. Cl.
*G10L 15/00* (2013.01)
*G10L 25/78* (2013.01)
*H04R 1/08* (2006.01)

(52) U.S. Cl.
CPC ............. *G10L 25/78* (2013.01); *H04R 1/08* (2013.01)

(58) Field of Classification Search
CPC .............. G10L 25/78; H04R 1/08; G06T 7/33
USPC ......................................................... 704/231
See application file for complete search history.

(56) References Cited

U.S. PATENT DOCUMENTS

| | | |
|---|---|---|
| 2013/0297305 A1 | 11/2013 | Turnbull |
| 2019/0208318 A1 | 7/2019 | Chowdhary et al. |
| 2022/0237766 A1* | 7/2022 | Jiang ........................ G06T 7/33 |

FOREIGN PATENT DOCUMENTS

| | | | |
|---|---|---|---|
| CN | 101778322 | A | 7/2010 |
| CN | 105513605 | A | 4/2016 |
| CN | 108028977 | A | 5/2018 |
| CN | 108538306 | A | 9/2018 |
| CN | 108831499 | A | 11/2018 |
| CN | 110858488 | A | 3/2020 |
| CN | 111308436 | A | 6/2020 |

(Continued)

OTHER PUBLICATIONS

International Search Report of PCT/CN2021/139747(Sep. 14, 2022).

(Continued)

*Primary Examiner* — Md S Elahee
(74) *Attorney, Agent, or Firm* — Fideli Law PLLC; Qiang Li

(57) ABSTRACT

A voice activity detection method and system and a voice enhancement method and system are provided. A voice presence probability of a target voice signal present in microphone signals may be determined by calculating a linear correlation between a signal subspace where the microphone signals are located and a target subspace where the target voice signal is located. The voice enhancement method and system may be used to calculate filter coefficients based on the voice presence probability, so as to perform voice enhancement on the microphone signals. The calculation accuracy of the voice presence probability is improved, and the voice enhancement effect is also improved.

20 Claims, 9 Drawing Sheets

(56) References Cited

FOREIGN PATENT DOCUMENTS

| CN | 116982112 | A | | 10/2023 | |
|---|---|---|---|---|---|
| EP | 1473964 | A2 | * | 11/2004 | ......... G10L 21/0208 |
| JP | 2002091467 | A | | 3/2002 | |
| KR | 20110120788 | A | | 11/2011 | |
| TW | 200843541 | A | | 11/2008 | |
| WO | 2017094862 | A1 | | 6/2017 | |

OTHER PUBLICATIONS

Kim Dong Kook et al: "A subspace approach based on embedded prewhitening for voice activity detection", The Journal of the Acoustical Society of America, American Institute of Physics, 2 Huntington Quadrangle, Melville, NY 11747, vol. 130, No. 5, Nov. 1, 2011 (Nov. 1, 2011), pp. EL304-EL310, XP012152937, ISSN: 0001-4966, DOI: 10.1121/1.3638927 [retrieved on Oct. 6, 2011] * sections 1, 2 *.

Hioka Yusuke et al: "Voice activity detection with array signal processing in the wavelet domain", 2010 18th European Signal Processing Conference, IEEE, Sep. 3, 2002 (Sep. 3, 2002), pp. 1-4, XP032754214, ISSN: 2219-5491, [retrieved on Mar. 27, 2015] *sections 3.4-3.6 *.

Hioka Yusuke: "Voice activity detection with array signal processing in the wavelet domain" IEICE TRA NS. Fundamentals, (Nov. 2003) , vol. E86-A, No. 11 , p. 2802-2811.

Hioka Yusuke et al: "Voice activity detection with array signal processing in the wavelet domain" Technical Research Report of Electronic Information and Communication Society, Japan, Electronic Information and Communication Society (Jan. 18, 2002), vol. 101, No. 604, p. 9-16.

Araki Shoko et al: "Microphone array speech processing techniques for conversation scene analysis" Technical Research Report of Electronic Information and Communication Society, Japan, Electronic Information and Communication Society(May 5, 2011), vol. 111, No. 28, p. 83-88.

Hassani et al: "LCMV beamforming with subspace projection for multi-speaker speech enhancement", 2016 IEEE International Conference on Acoustics, Speech and Signal Processing (ICASSP) May 19, 2016 , DOI: 10.1109/ICASSP.2016.7471643.

Qian Jin et al., "Study on Signal Subspace Approach for Speech Enhancement" China Master's Theses Full-Text Database, CMFD (Information Technology Section), Sep. 15, 2011.

Hailong Shi et al. "The Volume-Correlation Subspace Detector" https://arxiv.org/abs/1406.1 286v2, Dec. 16, 2015.

Le Xiao et al., "The Research Voice Wakeup Technologu Based on Transfer Learning" China Master's Theses Full-Text Database, CMFD (Information Technology Section), Jul. 15, 2020.

* cited by examiner

VOICE ACTIVITY DETECTION METHOD AND SYSTEM, AND VOICE ENHANCEMENT METHOD AND SYSTEM

RELATED APPLICATIONS

This application is a continuation application of PCT application No. PCT/CN2021/139747, filed on Dec. 20, 2021, and the content of which is incorporated herein by reference in its entirety.

TECHNICAL FIELD

This disclosure relates to the field of target voice signal processing technologies, and in particular, to a voice activity detection method and system, and a voice enhancement method and system.

BACKGROUND

In the voice enhancement technology based on a beamforming algorithm, and especially in the minimum variance distortionless response (MVDR) adaptive beamforming algorithm, it is very important to solve a noise covariance matrix—a parameter describing a noise statistics feature relationship between different microphones. A main method in the existing technologies is to calculate a noise covariance matrix based on a voice presence probability method, for example, estimating a voice presence probability by using a voice activity detection (VAD) method, and then calculate the noise covariance matrix. However, accuracy of estimating the voice presence probability in the existing technologies is not high enough, resulting in low precision of estimating the noise covariance matrix and further causing a poor voice enhancement effect of the MVDR algorithm. Especially when the quantity of microphones is low, for example, less than 5, the effect deteriorates sharply. Therefore, the MVDR algorithm in the existing technologies is mainly used in a microphone array device having a large quantity of microphones with large spaces, such as a mobile phone and a smart speaker, but the voice enhancement effect is poor for a device having a small quantity of microphones with small spacings, such as a headset.

In light of the foregoing, a voice activity detection method and system, and a voice enhancement method and system having high precision need to be provided.

SUMMARY

This disclosure provides a voice activity detection method and system, and a voice enhancement method and system having higher precision.

In a first aspect, the present disclosure provides a voice activity detection system, including: at least one storage medium storing a set of instructions for voice activity detection; and at least one processor in communication with the at least one storage medium, where during an operation of voice activity detection for M microphones distributed in a preset array shape, where M is an integer greater than 1, the at least one processor executes the set of instructions to: obtain microphone signals output by the M microphones, determine, based on the microphone signals, a signal subspace formed by the microphone signals, determine a target subspace formed by a target voice signal, and determine, based on a linear correlation between the signal subspace and the target subspace, a voice presence probability of the target voice signal being present in the microphone signals, and output the voice presence probability.

In a second aspect, the present disclosure provides a voice activity detection method for M microphones distributed in a preset array shape, where M is an integer greater than 1, the voice activity detection method including: obtaining microphone signals output by the M microphones; determining, based on the microphone signals, a signal subspace formed by the microphone signals; determining a target subspace formed by a target voice signal; and determining, based on a linear correlation between the signal subspace and the target subspace, a voice presence probability of the target voice signal being present in the microphone signals, and outputting the voice presence probability.

In a third aspect, the present disclosure provides a voice enhancement system, including: at least one storage medium storing a set of instructions for voice enhancement; and at least one processor in communication with the at least one storage medium, where during an operation of voice enhancement for M microphones distributed in a preset array shape, where M is an integer greater than 1, the at least one processor executes the set of instructions to: obtain microphone signals output by the M microphones, determine a voice presence probability of a target voice signal being present in the microphone signals, determine, based on the voice presence probability, filter coefficient vectors corresponding to the microphone signals, and combine the microphone signals based on the filter coefficient vectors to obtain a target audio signal and output the target audio signal, where to determine the voice presence probability of the target voice signal being present in the microphone signals, the at least one processor executes the set of instructions to: determine, based on the microphone signals, a signal subspace formed by the microphone signals, determine a target subspace formed by a target voice signal, and determine, based on a linear correlation between the signal subspace and the target subspace, the voice presence probability of the target voice signal being present in the microphone signals, and output the voice presence probability.

In a fourth aspect, the present disclosure provides a voice enhancement method for M microphones distributed in a preset array shape, where M is an integer greater than 1, the voice enhancement method including: obtaining microphone signals output by the M microphones; determining a voice presence probability of a target voice signal being present in the microphone signals; determining, based on the voice presence probability, filter coefficient vectors corresponding to the microphone signals; and combining the microphone signals based on the filter coefficient vectors to obtain a target audio signal and outputting the target audio signal, where the determining of the voice presence probability of the target voice signal being present in the microphone signals includes: determining, based on the microphone signals, a signal subspace formed by the microphone signals, determining a target subspace formed by a target voice signal, and determining, based on a linear correlation between the signal subspace and the target subspace, the voice presence probability of the target voice signal being present in the microphone signals, and outputting the voice presence probability.

As can be known from the foregoing technical solutions, the voice activity detection method and system, and the voice enhancement method and system provided in this disclosure are used for a microphone array including a plurality of microphones. The microphone array may capture both a noise signal and a target voice signal, and output a microphone signal. The target voice signal and the noise signal are two non-overlapping signals. A target subspace in which the target voice signal is located and a noise subspace in which the noise signal is located are two non-overlapping subspaces. When the target voice signal is absent in the microphone signal, the microphone signal includes only the noise signal. In this case, a signal subspace in which the microphone signal is located and the target subspace in which the target voice signal is located are two non-overlapping subspaces, and a linear correlation between the signal subspace and the target subspace is low. When the target voice signal is present in the microphone signal, the microphone signal includes both the target voice signal and the noise signal. In this case, the signal subspace in which the microphone signal is located and the target subspace in which the target voice signal is located are two overlapping subspaces, and the linear correlation between the signal subspace and the target subspace is high. Therefore, by calculating the linear correlation between the signal subspace in which the microphone signal is located and the target subspace in which the target voice signal is located, the voice activity detection method and system provided in this disclosure may determine a voice presence probability of the target voice signal being present in the microphone signal. The voice enhancement method and system may calculate a filter coefficient based on the voice presence probability to perform voice enhancement on the microphone signal. The method and system may improve calculation precision of the voice presence probability and further improve a voice enhancement effect.

Other functions of the voice activity detection method and system, and the voice enhancement method and system provided in this disclosure are partially described in the following description. Based on the description, the contents described in the following figures and examples would be obvious to a person of ordinary skill in the art. The inventive aspects of the voice activity detection method and system, and the voice enhancement method and system provided in this disclosure may be fully explained by practicing or using the method, apparatus, and a combination thereof in the following detailed examples.

BRIEF DESCRIPTION OF THE DRAWINGS

To describe the technical solutions in the embodiments of this disclosure more clearly, the following briefly describes the accompanying drawings required for describing the embodiments. Apparently, the accompanying drawings in the following description show merely some exemplary embodiments of this disclosure, and a person of ordinary skill in the art may still derive other drawings from these drawings without creative efforts.

DETAILED DESCRIPTION

Figure 1:
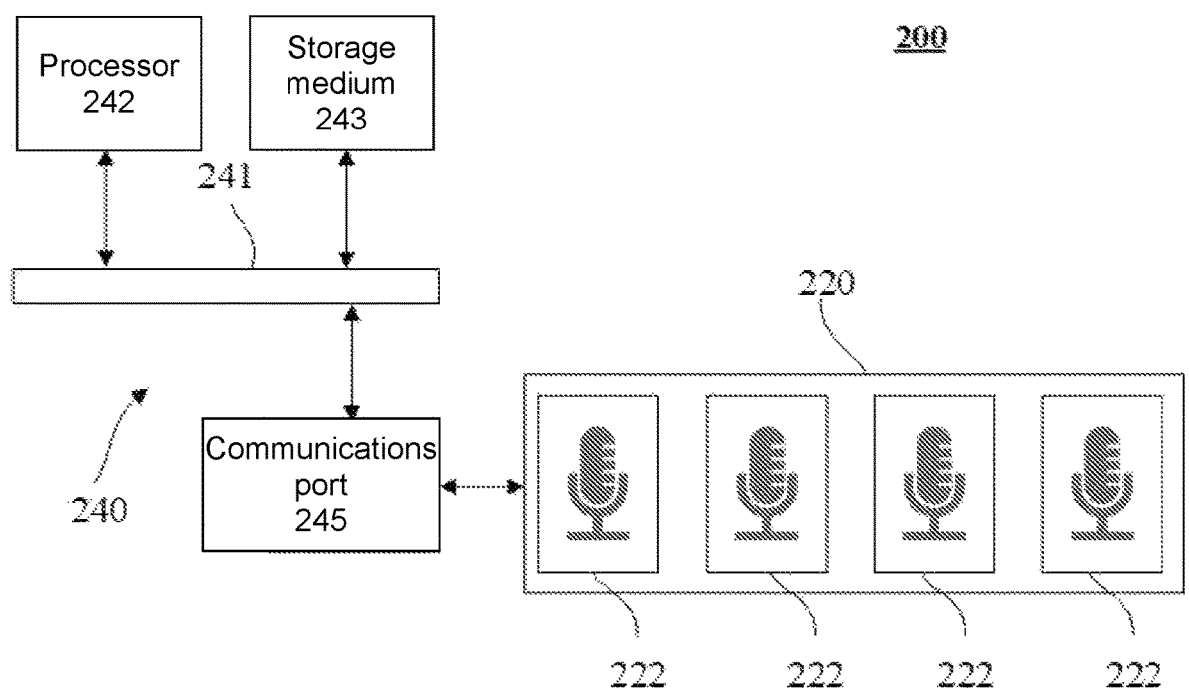
FIG. 1 is a schematic hardware diagram of a voice activity detection system according to some exemplary embodiments of this disclosure.

The following description provides specific application scenarios and requirements of this disclosure, to enable a person skilled in the art to make and use content of this disclosure. Various partial modifications to the disclosed exemplary embodiments are obvious to a person skilled in the art. General principles defined herein may be applied to other embodiments and applications without departing from the spirit and scope of this disclosure. Therefore, this disclosure is not limited to the illustrated exemplary embodiments, but is to be accorded the widest scope consistent with the claims.

The terms used herein are only intended to describe specific exemplary embodiments and are not restrictive. For example, as used herein, singular forms "a", "an", and "the" may also include plural forms, unless otherwise explicitly specified in a context. When used in this disclosure, the terms "comprising", "including", and/or "containing" indicate presence of associated integers, steps, operations, elements, and/or components, but do not preclude presence of one or more other features, integers, steps, operations, elements, components, and/or groups or addition of other features, integers, steps, operations, elements, components, and/or groups to the system/method.

In view of the following description, these features and other features of this disclosure, operations and functions of related elements of structures, and economic efficiency in combining and manufacturing components may be significantly improved. All of these form a part of this disclosure with reference to the drawings. However, it should be understood that the drawings are only for illustration and description purposes and are not intended to limit the scope of this disclosure. It should also be understood that the drawings are not drawn to scale.

Flowcharts used in this disclosure show operations implemented by the system according to some exemplary embodiments of this disclosure. It should be understood that operations in the flowcharts may be implemented out of the order described herein. The operations may be implemented in a reverse order or simultaneously. In addition, one or more other operations may be added to the flowcharts, and one or more operations may be removed from the flowcharts.

For ease of description, the following first explains terms that will appear in this disclosure.

Minimum variance distortionless response (MVDR): It is an adaptive beamforming algorithm based on a maximum signal to interference plus noise ratio (SINR) criterion. The MVDR algorithm can adaptively minimize power of an array output in a desired direction while maximizing the signal to interference plus noise ratio. Its objective is to minimize a variance of a recorded signal. If a noise signal is uncorrelated with a desired signal, the variance of the recorded signal is a sum of variances of the desired signal and the noise signal. Therefore, the MVDR solution seeks to minimize this sum, thereby mitigating impact of the noise signal. Its principle is to choose an appropriate filter coefficient to minimize average power of the array output under a constraint that the desired signal is distortionless.

Voice activity detection: It is a process of segmenting a target voice signal into a voice period and a non-voice period.

Gaussian distribution: A normal distribution is also known as Gaussian distribution. A normal curve is bell-shaped, low at both ends, high in the middle, and left-right symmetric. Because the curve of the Gaussian distribution is bell-shaped, the curve is also often referred to as a bell-shaped curve. If a random variable X conforms to a with a mathematical expectation $\mu$ and a variance $\sigma^2$, the normal distribution is denoted as $N(\mu, \sigma^2)$. A probability density function of the random variable is an expected value $\mu$ of the normal distribution, which determines a position of the random variable. A standard deviation $\sigma$ of the random variable determines an amplitude of the distribution. When $\mu=0$ and $\sigma=1$, the normal distribution is a standard normal distribution.

FIG. 1 is a schematic hardware diagram of a voice activity detection system according to some exemplary embodiments of this disclosure. The voice activity detection system may be applied to an electronic device 200.

In some exemplary embodiments, the electronic device 200 may be a wireless head phone, a wired head phone, or an intelligent wearable device, for example, a device having an audio processing function such as smart glasses, a smart helmet, or a smart watch. The electronic device 200 may also be a mobile device, a tablet computer, a notebook computer, a built-in apparatus of a motor vehicle, or the like, or any combination thereof. In some exemplary embodiments, the mobile device may include a smart household device, a smart mobile device, or the like, or any combination thereof. For example, the smart mobile device may include a mobile phone, a personal digital assistant, a game device, a navigation device, an ultra-mobile personal computer (UMPC), or the like, or any combination thereof. In some exemplary embodiments, the smart household device may include a smart television, a desktop computer, or the like, or any combination thereof. In some exemplary embodiments, the built-in apparatus of the motor vehicle may include a vehicle-mounted computer, a vehicle-mounted (onboard) television, or the like.

In this disclosure, an example in which the electronic device 200 is a head phone is used for description. The head phone may be a wireless head phone, or may be a wired head phone. As shown in FIG. 1, the electronic device 200 may include a microphone array 220 and a computing apparatus 240.

The microphone array 220 may be an audio capture device of the electronic device 200. The microphone array 220 may be configured to obtain a local audio, and output a microphone signal(s), that is, an electronic signal(s) carrying the audio information. The microphone array 220 may include M microphones 222 distributed in a preset array shape. M is an integer greater than 1. The M microphones 222 may be distributed evenly or unevenly. The M microphones 222 may output microphone signals. The M microphones 222 may output M microphone signals. Each microphone 222 corresponds to one microphone signal. The M microphone signals are collectively referred to as the microphone signal. In some exemplary embodiments, the M microphones 222 may be distributed linearly. In some exemplary embodiments, the M microphones 222 may be distributed in an array of another shape, such as a circular array or a rectangular array. For ease of description, the linear distribution of the M microphones 222 is used as an example for description in the following description. In some exemplary embodiments, M may be any integer greater than 1, such as 2, 3, 4, 5, or even greater. In some exemplary embodiments, due to a space limitation, M may be an integer greater than 1 and not greater than 5, for example, in a product such as a head phone. When the electronic device 200 is a head phone, a spacing between adjacent microphones 222 of the M microphones 222 may be 20 mm to 40 mm. In some exemplary embodiments, the spacing between adjacent microphones 222 may be smaller, for example, 10 mm to 20 mm.

In some exemplary embodiments, the microphone 222 may be a bone conduction microphone that directly captures human body vibration signals. The bone conduction microphone may include a vibration sensor, for example, an optical vibration sensor or an acceleration sensor. The vibration sensor may capture a mechanical vibration signal (for example, a signal generated by a vibration generated by a skin or a bone when a user speaks), and convert the mechanical vibration signal into an electrical signal. Herein, the mechanical vibration signal mainly refers to a vibration propagated by a solid. The bone conduction microphone captures, by touching the skin or bone of the user with the vibration sensor or a vibration component connected to the vibration sensor, a vibration signal generated by the bone or skin when the user generates sound, and converts the vibration signal into an electrical signal. In some exemplary embodiments, the vibration sensor may be an apparatus that is sensitive to a mechanical vibration but insensitive to an air vibration (that is, a capability of responding to the mechanical vibration by the vibration sensor exceeds a capability of responding to the air vibration by the vibration sensor). Since the bone conduction microphone may directly pick a vibration signal of a sound generation part, the bone conduction microphone may reduce impact of ambient noise.

In some exemplary embodiments, the microphone 222 may alternatively be an air conduction microphone that directly captures air vibration signals. The air conduction microphone captures an air vibration signal caused when the user generates sound, and converts the air vibration signal into an electrical signal.

In some exemplary embodiments, the M microphones 222 may be M bone conduction microphones. In some exemplary embodiments, the M microphones 222 may alternatively be M air conduction microphones. In some exemplary embodiments, the M microphones 222 may include both bone conduction microphone(s) and air conduction microphone(s). Certainly, the microphone 222 may alternatively be another type of microphone, for example, an optical microphone, a microphone receiving a myoelectric signal.

The computing apparatus 240 may be in communication with the microphone array 220. The communication herein may be a communication in any form and capable of directly or indirectly receiving information. In some exemplary embodiments, the computing apparatus 240 and the microphone array 220 may transfer data to each other over a wireless communication connection. In some exemplary embodiments, the computing apparatus 240 and the microphone array 220 may alternatively transfer data to each other over a direct connection by using a wire. In some exemplary embodiments, the computing apparatus 240 may alternatively be connected directly to another circuit by using a wire and hence connected indirectly to the microphone array 220 to implement mutual data transfer. The direct connection between the computing apparatus 240 and the microphone array 220 by using a wire is used as an example for description in this disclosure.

The computing apparatus 240 may be a hardware device having a data information processing function. In some exemplary embodiments, the voice activity detection system may include the computing apparatus 240. In some exemplary embodiments, the voice activity detection system may be applied to the computing apparatus 240. In other words, the voice activity detection system may operate on the computing apparatus 240. The voice activity detection system may include a hardware device having a data information processing function and a program required to drive the hardware device to work. Certainly, the voice activity detection system may also be only a hardware device having a data processing capability or only a program executed by a hardware device.

The voice activity detection system may store data or an instruction for performing a voice activity detection method described in this disclosure, and may execute the data and/or the instruction. When the voice activity detection system runs on the computing apparatus 240, the voice activity detection system may obtain the microphone signal from the microphone array 220 based on the communication connection, and execute the data or the instruction of the voice activity detection method described in this disclosure, to calculate a voice presence probability of a target voice signal being present in a microphone signal. The voice activity detection method is described in other parts of this disclosure. For example, the voice activity detection method is introduced in the descriptions of FIG. 3 to FIG. 8.

As shown in FIG. 1, the computing apparatus 240 may include at least one storage medium 243 and at least one processor 242. In some exemplary embodiments, the electronic device 200 may further include a communications port 245 and an internal communications bus 241.

The internal communications bus 241 may connect different system components, including the storage medium 243, the processor 242, and the communications port 245.

The communications port 245 may be used for data communication between the computing apparatus 240 and the outside world. For example, the computing apparatus 240 may obtain the microphone signal from the microphone array 220 through the communications port 245.

The at least one storage medium 243 may include a data storage apparatus. The data storage apparatus may be a non-transitory storage medium, or may be a transitory storage medium. For example, the data storage apparatus may include one or more of a magnetic disk, a read-only memory (ROM), or a random access memory (RAM). When the voice activity detection system operates on the computing apparatus 240, the storage medium 243 may further include at least one instruction set stored in the data storage apparatus, where the instruction set is used to perform voice activity detection on the microphone signal. The instruction is computer program code. The computer program code may include a program, a routine, an object, a component, a data structure, a process, a module, or the like for performing the voice activity detection method provided in this disclosure.

The at least one processor 242 may be in communication with the at least one storage medium 243 via the internal communications bus 241. The communication connection may be a communication in any form and capable of directly or indirectly receiving information. The at least one processor 242 is configured to execute the at least one instruction set. When the voice activity detection system may run on the computing apparatus 240, the at least one processor 242 reads the at least one instruction set, and implements, based on the at least one instruction set, the voice activity detection method provided in this disclosure. The processor 242 may perform all steps included in the voice activity detection method. The processor 242 may be in a form of one or more processors. In some exemplary embodiments, the processor 242 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor that may implement one or more functions, and the like, or any combination thereof. For illustration only, one processor 242 in the computing apparatus 240 is described in this disclosure. However, it should be noted that the computing apparatus 240 in this disclosure may further include a plurality of processors 242. Therefore, operations and/or method steps disclosed in this disclosure may be performed by one processor in this disclosure, or may be performed jointly by a plurality of processors. For example, if the processor 242 of the computing apparatus 240 in this disclosure performs step A and step B, it should be understood that step A and step B may also be performed jointly or separately by two different processors 242 (for example, the first processor performs step A, and the second processor performs step B, or the first processor and the second processor jointly perform step A and step B).

Figure 2A:
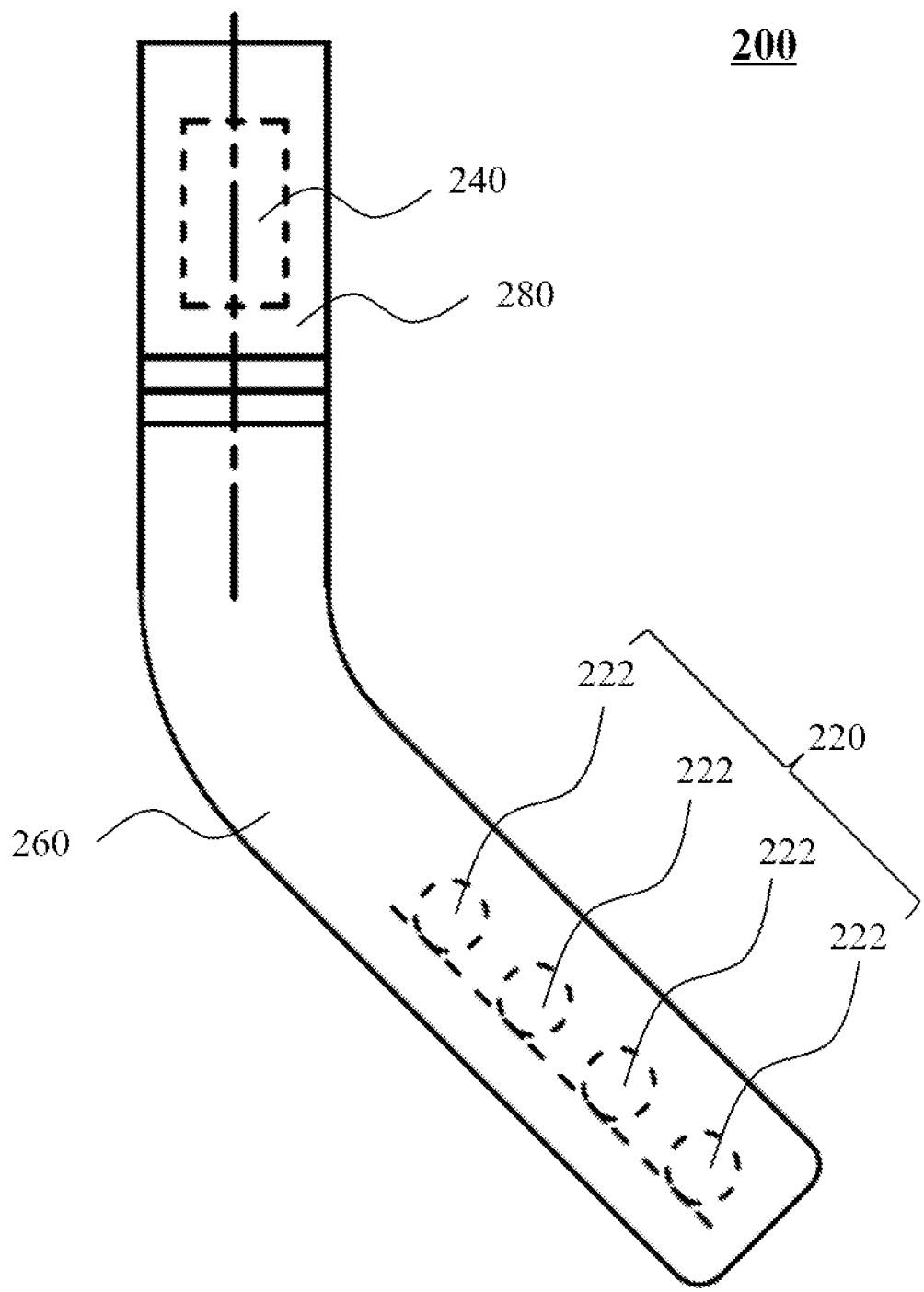
FIG. 2A is a schematic exploded structural diagram of an electronic device according to some exemplary embodiments of this disclosure.

FIG. 2A is a schematic exploded structural diagram of an electronic device 200 according to some exemplary embodiments of this disclosure. As shown in FIG. 2A, the electronic device 200 may include a microphone array 220, a computing apparatus 240, a first housing 260, and a second housing 280.

The first housing 260 may be a mounting base of the microphone array 220. The microphone array 220 may be mounted inside the first housing 260. A shape of the first housing 260 may be adaptively designed based on a distribution shape of the microphone array 220. This is not limited in this disclosure. The second housing 280 may be a mounting base of the computing apparatus 240. The computing apparatus 240 may be mounted in the second housing 280. A shape of the second housing 280 may be adaptively designed based on a shape of the computing apparatus 240. This is not limited in this disclosure. When the electronic device 200 is a head phone, the second housing 280 may be connected to a wearing part. The second housing 280 may be connected to the first housing 260. As described above, the microphone array 220 may be electrically connected to the computing apparatus 240. Specifically, the microphone array 220 may be electrically connected to the computing apparatus 240 via the connection between the first housing 260 and the second housing 280.

In some exemplary embodiments, the first housing 260 may be fixedly connected, for example, integrated, welded, riveted, or bonded, to the second housing 280. In some exemplary embodiments, the first housing 260 may be detachably connected to the second housing 280. The computing apparatus 240 may be in communication with different microphone arrays 220. Specifically, a difference between the different microphone arrays 220 may lie in different quantities of microphones 222 in the microphone arrays 220, different array shapes, different spacings between the microphones 222, different mounting angles of the microphone arrays 220 in the first housing 260, different mounting positions of the microphone arrays 220 in the first housing 260, or the like. Depending on different application scenarios, the user may change corresponding microphone arrays 220, so that the electronic device 200 may be applied to a wider range of scenarios. For example, when the user is closer to the electronic device 200 in an application scenario, the user may replace the microphone array 220 with a microphone array 220 having a smaller microphone spacing. In another example, when the user is closer to the electronic device 200 in an application scenario, the user may replace the microphone array 220 with a microphone array 220 having a larger microphone spacing and a larger microphone quantity.

The detachable connection may be a physical connection in any form, such as a threaded connection, a snap connection, or a magnetic connection. In some exemplary embodiments, there may be a magnetic connection between the first housing 260 and the second housing 280. To be specific, the first housing 260 and the second housing 280 are detachably connected to each other by a magnetic apparatus.

Figure 2B:
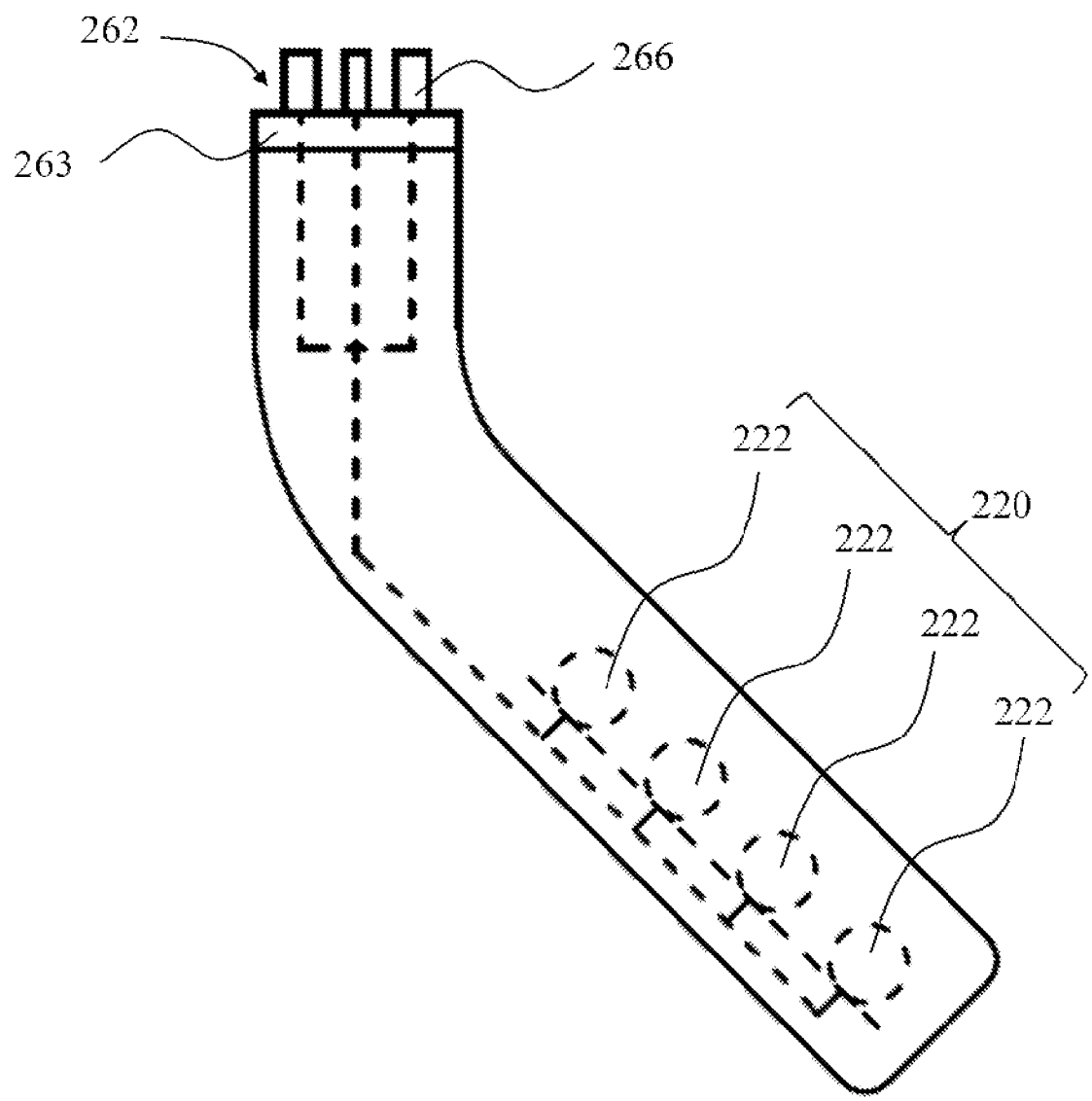
FIG. 2B is a front view of a first housing according to some exemplary embodiments of this disclosure.
Figure 2C:
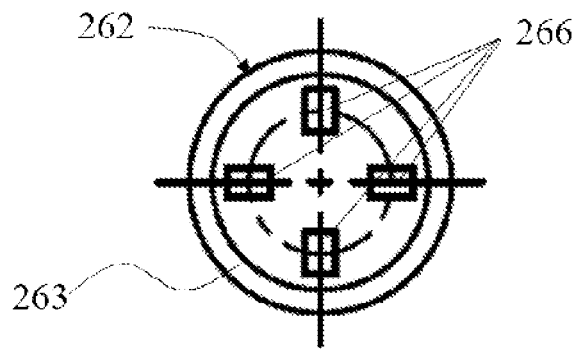
FIG. 2C is a top view of a first housing according to some exemplary embodiments of this disclosure.

FIG. 2B is a front view of the first housing 260 according to this embodiment of this disclosure. FIG. 2C is a top view of the first housing 260 according to this embodiment of this disclosure. As shown in FIG. 2B and FIG. 2C, the first housing 260 may include a first interface 262. In some exemplary embodiments, the first housing 260 may further include contacts 266. In some exemplary embodiments, the first housing 260 may further include an angle sensor (not shown in FIG. 2B and FIG. 2C).

The first interface 262 may be a mounting interface of the first housing 260 and the second housing 280. In some exemplary embodiments, the first interface 262 may be circular. The first interface 262 may be rotatably connected to the second housing 280. When the first housing 260 is mounted on the second housing 280, the first housing 260 may be rotated relative to the second housing 280 to adjust an angle of the first housing 260 relative to the second housing 280, thereby adjusting an angle of the microphone array 220.

A first magnetic apparatus 263 may be disposed on the first interface 262. The first magnetic apparatus 263 may be disposed at a position of the first interface 262 close to the second housing 280. The first magnetic apparatus 263 may generate magnetic adherence to achieve a detachable connection to the second housing 280. When the first housing 260 approaches the second housing 280, the first housing 260 may be quickly connected to the second housing 280 by the adherence. In some exemplary embodiments, after the first housing 260 is connected to the second housing 280, the first housing 260 may also be rotated relative to the second housing 280 to adjust the angle of the microphone array 220. Due to the adherence, the connection between the first housing 260 and the second housing 280 may still be maintained while the first housing 260 is rotated relative to the second housing 280.

In some exemplary embodiments, a first positioning apparatus (not shown in FIG. 2B and FIG. 2C) may also be disposed on the first interface 262. The first positioning apparatus may be an externally protruding positioning step or an internally extending positioning hole. The first positioning apparatus may cooperate with the second housing 280 to implement quick mounting of the first housing 260 and the second housing 280.

As shown in FIG. 2B and FIG. 2C, in some exemplary embodiments, the first housing 260 may further include contacts 266. The contacts 266 may be mounted on the first interface 262. The contacts 266 may protrude externally from the first interface 262. The contacts 266 may be elastically connected to the first interface 262. The contacts 266 may be in communication with the M microphones 222 in the microphone array 220. The contacts 266 may be made of an elastic metal to implement data transmission. When the first housing 260 is connected to the second housing 280, the microphone array 220 may be in communication with the computing apparatus 240 through the contacts 266. In some exemplary embodiments, the contacts 266 may be distributed in a circular shape. When the first housing 260 is rotated relative to the second housing 280 after the first housing 260 is connected to the second housing 280, the contacts 266 may also rotate relative to the second housing 280 and maintain a communication connection to the computing apparatus 240.

In some exemplary embodiments, an angle sensor (not shown in FIG. 2B and FIG. 2C) may be further disposed on the first housing 260. The angle sensor may be in communication with the contacts 266, thereby implementing a communication connection to the computing apparatus 240. The angle sensor may collect angle data of the first housing 260 to determine an angle at which the microphone array 220 is located, to provide reference data for subsequent calculation of a voice presence probability.

Figure 2D:
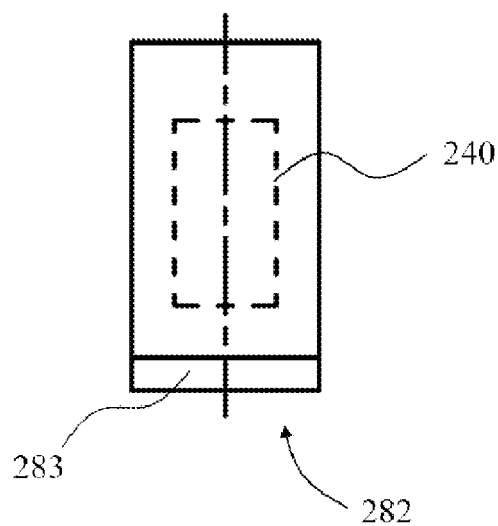
FIG. 2D is a front view of a second housing according to some exemplary embodiments of this disclosure.
Figure 2E:
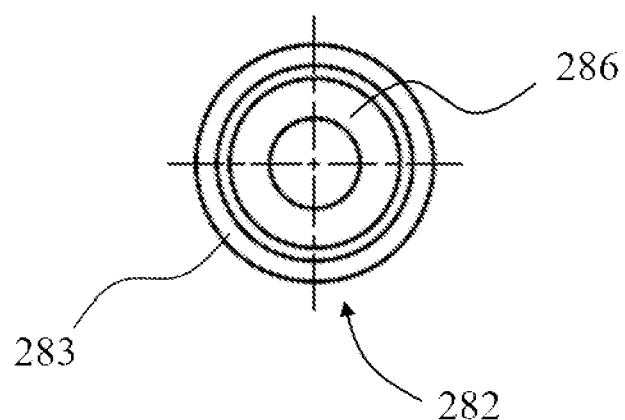
FIG. 2E is a bottom view of a second housing according to some exemplary embodiments of this disclosure.

FIG. 2D is a front view of the second housing 280 according to this embodiment of this disclosure. FIG. 2E is a bottom view of the second housing 280 according to this embodiment of this disclosure. As shown in FIG. 2D and FIG. 2E, the second housing 280 may include a second interface 282. In some exemplary embodiments, the second housing 280 may further include a guide rail 286.

The second interface 282 may be a mounting interface of the second housing 280 and the first housing 260. In some exemplary embodiments, the second interface 282 may be circular. The second interface 282 may be rotatably connected to the first interface 262 of the first housing 260. When the first housing 260 is mounted on the second housing 280, the first housing 260 may be rotated relative to the second housing 280 to adjust the angle of the first housing 260 relative to the second housing 280, thereby adjusting the angle of the microphone array 220.

A second magnetic apparatus 283 may be disposed on the second interface 282. The second magnetic apparatus 283 may be disposed at a position of the second interface 282 close to the first housing 260. The second magnetic apparatus 283 may generate magnetic adherence to achieve a detachable connection to the first interface 262. The second magnetic apparatus 283 may be used in cooperation with the first magnetic apparatus 263. When the first housing 260 approaches the second housing 280, the first housing 260 may be quickly mounted on the second housing 280 by the adherence between the second magnetic apparatus 283 and the first magnetic apparatus 263. When the first housing 260 is mounted on the second housing 280, a position of the second magnetic apparatus 283 is opposite to a position of the first magnetic apparatus 263. In some exemplary embodiments, after the first housing 260 is connected to the second housing 280, the first housing 260 may also be rotated relative to the second housing 280 to adjust the angle of the microphone array 220. Under the adherence, the connection between the first housing 260 and the second housing 280 may still be maintained while the first housing 260 is rotated relative to the second housing 280.

In some exemplary embodiments, a second positioning apparatus (not shown in FIG. 2D and FIG. 2E) may also be disposed on the second interface 282. The second positioning apparatus may be an externally protruding positioning step or an internally extending positioning hole. The second positioning apparatus may cooperate with the first positioning apparatus of the first housing 260 to implement quick mounting of the first housing 260 and the second housing 280. When the first positioning apparatus is the positioning step, the second positioning apparatus may be the positioning hole. When the first positioning apparatus is the positioning hole, the second positioning apparatus may be the positioning step.

As shown in FIG. 2D and FIG. 2E, in some exemplary embodiments, the second housing 280 may further include a guide rail 286. The guide rail 286 may be mounted on the second interface 282. The guide rail 286 may be in communication with the computing apparatus 240. The guide rail 286 may be made of a metal material to implement data transmission. When the first housing 260 is connected to the second housing 280, the contacts 266 may contact the guide rail 286 to form a communication connection, to implement the communication between the microphone array 220 and the computing apparatus 240 and implement data transmission. As described above, the contacts 266 may be elastically connected to the first interface 262. Therefore, after the first housing 260 is connected to the second housing 280, the contacts 266 may contact the guide rail 286 under elastic force of the elastic connection, so that a reliable communication may be implemented. In some exemplary embodiments, the guide rail 286 may be distributed in a circular shape. When the first housing 260 is rotated relative to the second housing 280 after the first housing 260 is connected to the second housing 280, the contacts 266 may also rotate relative to the guide rail 286 and maintain a communication connection to the guide rail 286.

Figure 3:
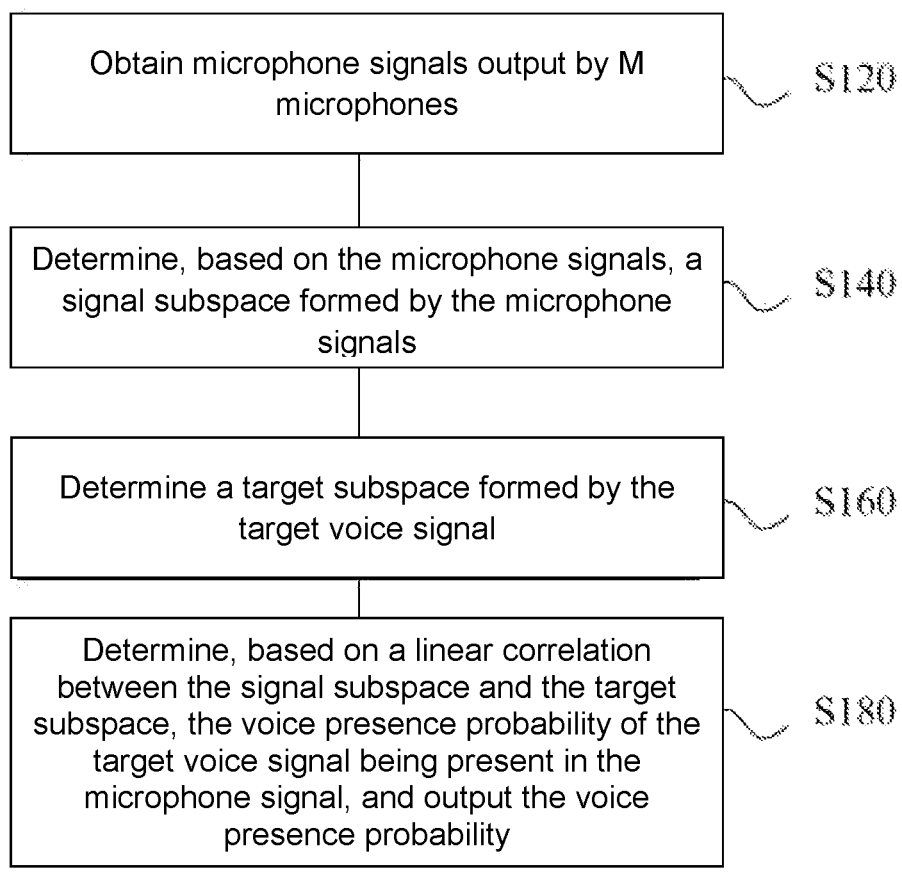
FIG. 3 is a flowchart of a voice activity detection method according to some exemplary embodiments of this disclosure.

FIG. 3 is a flowchart of a voice activity detection method P100 according to some exemplary embodiments of this disclosure. The method P100 may calculate a voice presence probability of a target voice signal being present in a microphone signal. Specifically, a processor 242 may perform the method P100. As shown in FIG. 3, the method P100 may include:

S120. Obtain microphone signals output by M microphones 222.

As described above, each microphone 222 may output a corresponding microphone signal. The M microphones 222 correspond to M microphone signals. When calculating a voice presence probability of a target voice signal being present in a microphone signal, the method P100 may perform the calculation based on all of the M microphone signals or may perform the calculation based on a part of the microphone signals. Therefore, the microphone signals may include the M microphone signals corresponding to the M microphones 222 or a part of microphone signals. In the subsequent description of this disclosure, an example in which the microphone signals may include the M microphone signals corresponding to the M microphones 222 is used for description.

In some exemplary embodiments, the microphone signal may be a time domain signal. For ease of description, a microphone signal at a time t is marked as x(t). The microphone signal x(t) may be a signal vector formed by the M microphone signals. In this case, the microphone signal x(t) may be expressed as the following formula:

$$x(t)=[x_1(t),x_2(t),\ldots,x_M(t)]^T \qquad \text{formula (1)}$$

The microphone signal x(t) is a time domain signal. In some exemplary embodiments, in step S120, a computing apparatus 240 may further perform a spectral analysis on the microphone signal x(t). Specifically, the computing apparatus 240 may perform a Fourier transform based on the time domain signal x(t) of the microphone signal to obtain a frequency domain signal $x_{f,t}$ of the microphone signal. In the following description, the microphone signal $x_{f,t}$ in frequency domain is described. $x_{f,t}$ may be an M-dimensional signal vector formed by M microphone signals. In this case, the microphone signal $x_{f,t}$ may be expressed as the following formula:

$$x_{f,t}=[x_{1,f,t},x_{2,f,t},\ldots,x_{M,f,t}]^T \qquad \text{formula (2)}$$

As described above, the microphone 222 may capture noise in an ambient environment and output a noise signal, and may also capture a voice of a target user and output a target voice signal. When the target user does not speak, the microphone signal includes only the noise signal. When the target user speaks, the microphone signal includes the target voice signal and the noise signal. The microphone signal $x_{f,t}$ may be expressed as the following formula:

$$x_{f,t}=Ps_{f,t}+Qd_{f,t} \qquad \text{formula (3)}$$

where $s_{f,t}$ is a complex amplitude of the target voice signal; P is a target steering vector of the target voice signal; $d_{f,t}$ is a noise signal in the microphone signal $x_{f,t}$; and Q is a noise steering vector of the noise signal.

$s_{f,t}$ is a complex amplitude of the target voice signal. In some exemplary embodiments, there is one target voice signal source around the microphone 222. In some exemplary embodiments, there are L target voice signal sources around the microphone 222. In this case, $s_{f,t}$ may be an L×1-dimensional vector. $s_{f,t}$ may be expressed as the following formula:

$$s_{f,t}=[s_{1,f,t},s_{2,f,t},\ldots,s_{L,f,t}]^T \qquad \text{formula (4)}$$

The target steering vector P is an M×L-dimensional matrix. The target steering vector P may be expressed as the following formula:

$$P = \begin{bmatrix} 1 & \cdots & 1 \\ e^{-j2\pi f_o \frac{d\cos\theta_1}{c}} & \cdots & e^{-j2\pi f_o \frac{d\cos\theta_L}{c}} \\ \vdots & \ddots & \vdots \\ e^{-j2\pi f_o(M-1)\frac{d\cos\theta_1}{c}} & \cdots & e^{-j2\pi f_o(M-1)\frac{d\cos\theta_L}{c}} \end{bmatrix} \qquad \text{formula (5A)}$$

where $f_0$ is a carrier frequency; d is a distance (spacing) between adjacent microphones 222; c is a speed of sound; and $\theta_1,\ldots,\theta_L$ are incident angles between the L target voice signal sources and microphones 222 respectively. In some exemplary embodiments, angles of the target voice signal source $s_{f,t}$ are generally distributed in a group of specific angle ranges. Therefore, $\theta_1,\ldots,\theta_L$ are known. Relative position relationships, such as relative distances or relative coordinates, of the M microphones 222 are prestored in the computing apparatus 240. To be specific, the distance d between adjacent microphones 222 is prestored in the computing device 240. In other words, the target steering vector P may be prestored in the computing apparatus 240.

The noise signal $d_{f,t}$ may be an M-dimensional signal vector captured by the M microphones 222. The noise signal $d_{f,t}$ may be expressed as the following formula: $d_{f,t}$ is the complex amplitude of the noise signal. In some exemplary embodiments, there are N noise signal sources around the microphone 222. In this case, $d_{f,t}$ may be an N×1-dimensional vector. $d_{f,t}$ may be expressed as the following formula:

$$d_{f,t}=[d_{1,f,t},d_{2,f,t},\ldots,d_{N,f,t}]^T \qquad \text{formula (5B)}$$

The noise steering vector Q is an M×N-dimensional matrix. Due to irregularity of the noise signal, the noise signal $d_{f,t}$ and the noise steering vector Q are unknown.

In some exemplary embodiments, formula (3) may also be expressed as follows:

$$x_{f,t}=[P,Q][s_{f,t}{}^T,d_{f,t}{}^T]^T \qquad \text{formula (6)}$$

where [P, Q] is a signal steering vector of the microphone signal $x_{f,t}$.

As described above, the microphone 222 may capture both the target voice signal $s_{f,t}$ and the noise signal $d_{f,t}$. The target voice signal $s_{f,t}$ and the noise signal $d_{f,t}$ are two non-overlapping signals. Therefore, a target subspace in which the target voice signal $s_{f,t}$ is located and a noise subspace in which the noise signal $d_{f,t}$ is located are two non-overlapping subspaces. Therefore, when the target voice signal $s_{f,t}$ is absent in the microphone signal $x_{f,t}$, the microphone signal $x_{f,t}$ includes only the noise signal $d_{f,t}$. In this case, the signal subspace in which the microphone signal $x_{f,t}$ is located and the target subspace in which the target voice signal $s_{f,t}$ is located are two non-overlapping subspaces, and a linear correlation between the signal subspace and the target subspace is low or zero. When the target voice signal $s_{f,t}$ is present in the microphone signal xft, the microphone signal $x_{f,t}$ includes both the target voice signal $s_{f,t}$ and the noise signal $d_{f,t}$. In this case, the signal subspace in which the microphone signal $x_{f,t}$ is located and the target subspace in which the target voice signal $s_{f,t}$ is located are two overlapping subspaces, and the linear correlation between the signal subspace and the target subspace is relatively high. Therefore, by calculating the linear correlation between the signal subspace in which the microphone signal $x_{f,t}$ is located and the target subspace in which the target voice signal $s_{f,t}$ is located, the computing apparatus 240 may determine a voice presence probability of the target voice signal $s_{f,t}$ being present in the microphone signal $x_{f,t}$. For ease of description, the signal subspace is defined as span($U_s$) and the target subspace is defined as span($U_t$).

As shown in FIG. 3, the method P100 may further include:

S140. Determine, based on the microphone signal(s) $x_{f,t}$, a signal subspace span($U_s$) formed by the microphone signal $x_{f,t}$.

Figure 4:
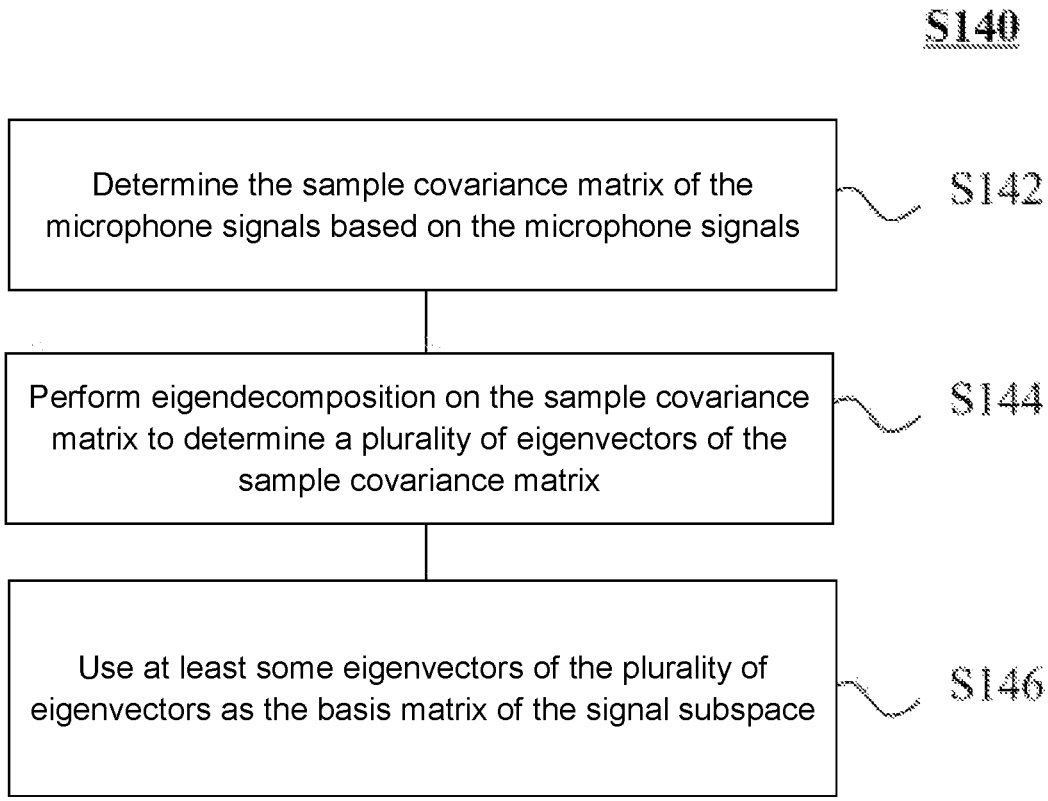
FIG. 4 is a flowchart for determining a basis matrix of a signal subspace according to some exemplary embodiments of this disclosure.

In some exemplary embodiments, determining the signal subspace span($U_s$) refers to determining a basis matrix $U_s$ of the signal subspace span($U_s$). In some exemplary embodiments, the computing apparatus 240 may determine the basis matrix $U_s$ of the signal subspace span($U_s$) based on a sample covariance matrix of the microphone signal $x_{f,t}$. For ease of description, the sample covariance matrix is defined as $M^x$. FIG. 4 is a flowchart for determining the basis matrix $U_s$ of the signal subspace span($U_s$) according to some exemplary embodiments of this disclosure. The corresponding step shown in FIG. 4 is that the computing apparatus 240 determines the basis matrix $U_s$ of the signal subspace span ($U_s$) based on the sample covariance matrix $M^x$ of the microphone signal $x_{f,t}$. As shown in FIG. 4, step S140 may include the following steps.

S142. Determine the sample covariance matrix $M^x$ of the microphone signal $x_{f,t}$ based on the microphone signal $x_{f,t}$.

The sample covariance matrix $M^x$ may be expressed as the following formula:

$$M^x=x_{f,t}x_{f,t}{}^H \qquad \text{formula (7)}$$

S144. Perform eigendecomposition on the sample covariance matrix $M^x$ to determine a plurality of eigenvectors of the sample covariance matrix $M_1$.

Further, eigendecomposition is performed on the sample covariance matrix $M^x$ to obtain a plurality of eigenvalues of the sample covariance matrix $M^x$. The sample covariance matrix $M^x$ is an M×M-dimensional matrix. A quantity of eigenvalues of the sample covariance matrix $M_x$ is M, and the M eigenvalues may be expressed as the following formula:

$$\lambda_1 \geq \lambda_2 \geq \ldots \geq \lambda_q = \lambda_{q+1} = \ldots = \lambda_M \qquad \text{formula (8)}$$

where $1 \leq q \leq M$.

The M eigenvalues correspond to M eigenvectors. For ease of description, the M eigenvectors are defined as $u_1, u_2, \ldots, u_q, u_{q+1}, \ldots, u_M$. The M eigenvalues correspond to the M eigenvectors on a one-to-one basis.

S146. Use at least some eigenvectors of the plurality of eigenvectors as the basis matrix $U_s$ of the signal subspace span($U_s$).

In some exemplary embodiments, the computing apparatus 240 may use a matrix formed by the M eigenvectors as the basis matrix $U_s$ of the signal subspace span($U_s$). In some exemplary embodiments, the computing apparatus 240 may use a matrix formed by a part of the M eigenvectors as the basis matrix $U_s$ of the signal subspace span($U_s$). Because $\lambda_q = \lambda_{q+1} = \ldots = \lambda_M$, the computing apparatus 240 may use a matrix formed by q eigenvectors $u_1, u_2, \ldots, u_q$ corresponding to q different eigenvalues $\lambda_1, \lambda_2, \ldots, \lambda_q$ as the basis matrix $U_s$ of the signal subspace span($U_s$). The basis matrix $U_s$ of the signal subspace span($U_s$) is an M×q full-column-rank matrix.

Figure 5:
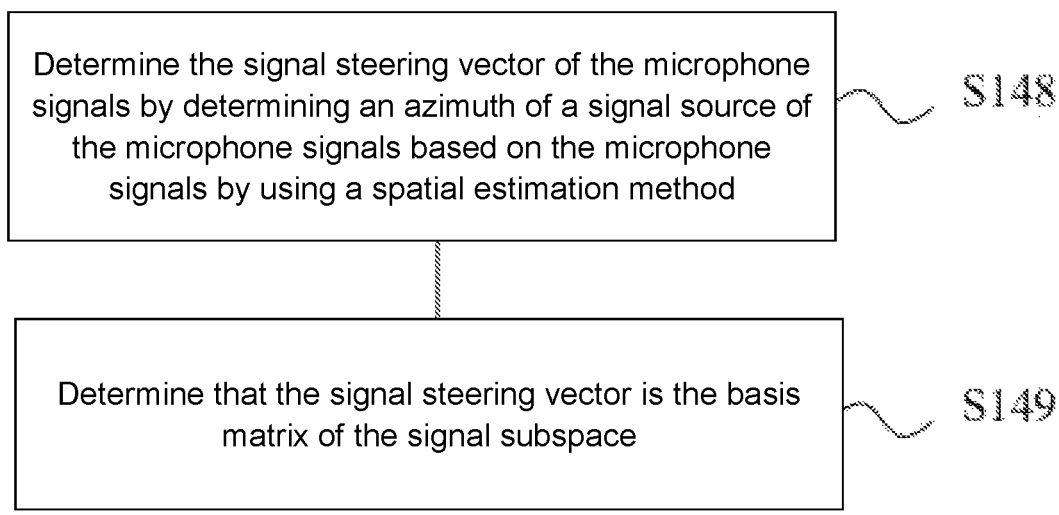
FIG. 5 is another flowchart for determining a basis matrix of a signal subspace according to some exemplary embodiments of this disclosure.

In some exemplary embodiments, the computing apparatus 240 may determine the basis matrix $U_s$ of the signal subspace span($U_s$) based on the signal steering vector [P, Q] of the microphone signal $x_{f,t}$. FIG. 5 is another flowchart for determining the basis matrix $U_s$ of the signal subspace span($U_s$) according to some exemplary embodiments of this disclosure. The corresponding step shown in FIG. 5 is that the computing apparatus 240 determines the basis matrix $U_s$ of the signal subspace span($U_s$) based on the signal steering vector [P, Q] of the microphone signal $x_{f,t}$. As shown in FIG. 5, step S140 may include:

S148. Determine the signal steering vector [P, Q] of the microphone signal(s) $x_{f,t}$ by determining an azimuth of a signal source of the microphone signal(s) $x_{f,t}$ based on the microphone signal(s) $x_{f,t}$ by using a spatial estimation method.

As described above, the target steering vector P may be prestored in the computing apparatus 240, and the noise steering vector Q is unknown. The computing apparatus 240 may estimate the noise steering vector Q based on the spatial estimation method to determine the signal steering vector [P, Q]. The spatial estimation method may include at least one of a DOA estimation method (also referred to as direction of arrival estimation) and a spatial spectrum estimation method. The DOA estimation method may include but is not limited to a linear spectrum estimation (for example, a periodogram method), a maximum likelihood spectrum estimation method, a maximum entropy method, a MUSIC algorithm (Multiple Signal Classification algorithm, also referred to as a multiple signal classification algorithm), an ESPRIT algorithm (Estimating signal parameters viarotational invariance techniques, also referred to as a viarotational invariance method), or the like.

S149. Determine that the signal steering vector [P, Q] is the basis matrix $U_s$ of the signal subspace span ($U_s$).

In this case, the basis matrix $U_s$ of the signal subspace span($U_s$) is an M×(L+N)-dimensional full-column-rank matrix.

As shown in FIG. 3, the method P100 may further include:

S160. Determine the target subspace span($U_t$) formed by the target voice signal.

In some exemplary embodiments, the determining of the target subspace span($U_t$) refers to determining the basis matrix $U_t$ of the target subspace span($U_t$). As described above, the target steering vector P may be prestored in the computing apparatus. Step S160 may be: The computing apparatus 240 determines that a preset target steering vector P corresponding to the target voice signal is the basis matrix $U_t$ of the target subspace span($U_t$). The basis matrix $U_t$ of the target subspace span($U_t$) is an M×L-dimensional full-column-rank matrix.

As shown in FIG. 3, the method P100 may further include:

S180. Determine, based on the linear correlation between the signal subspace span($U_s$) and the target subspace span ($U_t$), the voice presence probability λ of the target voice signal being present in the microphone signal $x_{f,t}$, and output the voice presence probability.

Figure 6:
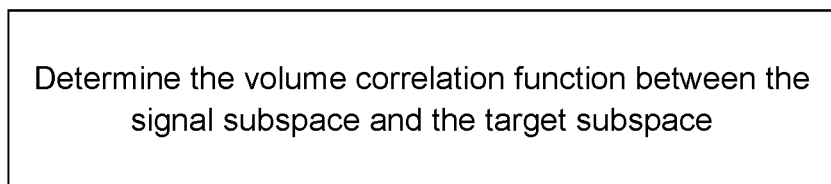
FIG. 6 is a flowchart for calculating a voice presence probability according to some exemplary embodiments of this disclosure.
Figure 6:
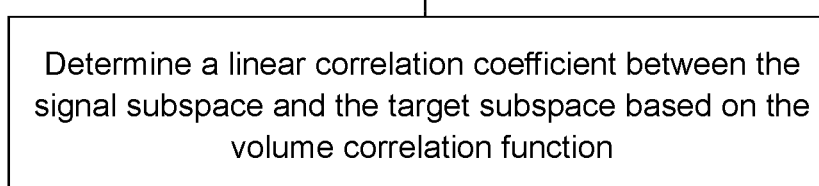
Figure 6:
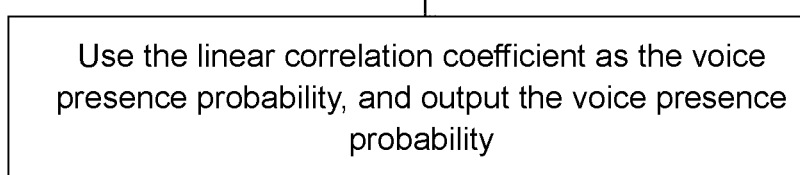

In some exemplary embodiments, the computing apparatus 240 may calculate the linear correlation between the signal subspace span($U_s$) and the target subspace span($U_t$) by calculating the linear correlation between the signal subspace span($U_s$) and a volume correlation function of the target subspace span($U_t$). FIG. 6 is a flowchart for calculating the voice presence probability λ according to some exemplary embodiments of this disclosure. FIG. 6 shows step S180. As shown in FIG. 6, step S180 may include:

S182. Determine the volume correlation function between the signal subspace span($U_s$) and the target subspace span ($U_t$).

The volume correlation function between the signal subspace span($U_s$) and the target subspace span($U_t$) may be a volume correlation function vcc($U_s$, $U_t$) between the basis matrix $U_s$ of the signal subspace span($U_s$) and the basis matrix $U_t$ of the target subspace span($U_t$).

When the basis matrix $U_s$ of the signal subspace span($U_s$) is an M×q-dimensional full-column-rank matrix determined based on the sample covariance matrix $M^x$ of the microphone signal $x_{f,t}$, the volume correlation function vcc($U_s$, $U_t$) may be expressed as the following formula:

$$vcc(U_s, U_t) = \frac{vol_{q+L}([U_s, U_t])}{vol_q(U_s)vol_L(U_t)} \quad \text{formula (9)}$$

where $vol_q(U_s)$ represents a q-dimensional volume function of the M×q-dimensional basis matrix $U_s$; and $vol_L(U_t)$ represents an L-dimensional volume function of the M×L-dimensional basis matrix $U_t$. $vol_q(U_s)$ may be expressed as the following formula:

$$vol_q(U_s) = \begin{cases} \prod_{i=1}^{q} \gamma_{s,i} & q \le \min\{M, q\} \\ 0 & \text{others} \end{cases} \quad \text{formula (10)}$$

where $\gamma_{s,i}$ is a singular value of $U_s$; i=1, ..., min{M, q}; $\gamma_{s,1} \ge \gamma_{s,2} \ge ... \ge \gamma_{s,min\{M,q\}} \ge 0$; and $vol_q(U_s)$ may be considered as a volume of a polyhedron spanned by column vectors of $U_s$.

$vol_L(U_t)$ may be expressed as the following formula:

$$vol_L(U_t) = \begin{cases} \prod_{j=1}^{L} \gamma_{t,i} & L \le \min\{M, L\} \\ 0 & \text{others} \end{cases} \quad \text{formula (11)}$$

where $\gamma_{t,j}$ is a singular value of $U_t$; j=1, ..., min{M, L}; $\gamma_{t,1} \ge \gamma_{t,2} \ge ... \ge \gamma_{t,min\{M,L\}} \ge 0$; and $vol_L(U_t)$ may be considered as a volume of a polyhedron spanned by column vectors of $U_t$.

$vol_{q+L}([U_s,U_t])$ may be expressed as the following formula:

$$vol_{q+L}([U_s,U_t]) = vol_q(U_s)vol_L(U_t)\Pi_p^{min\{q,L\}}\theta_p \quad \text{formula (12)}$$

where $0 \le \theta_1 \le \tau_2 \le ... \le \theta_{min\{q,L\}} \le \pi/2$; and $\theta_p$ represents spatial principal angles of the target subspace span($U_t$) spanned by $U_t$ and the signal subspace span($U_s$) spanned by $U_s$.

Figure 7:
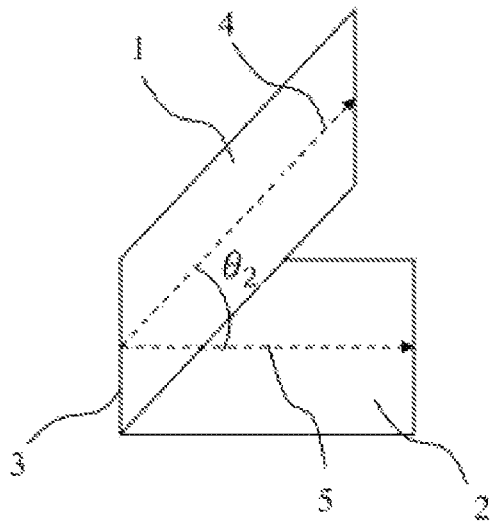
FIG. 7 is a schematic diagram of a spatial principal angle according to some exemplary embodiments of this disclosure.

As can be seen from the formulas (9) and (12), the volume correlation function vcc($U_s$, $U_t$) is actually a product of sines of the spatial principal angles of the two subspaces (the target subspace span($U_t$) and the signal subspace span($U_s$)). FIG. 7 is a schematic diagram of a spatial principal angle according to some exemplary embodiments of this disclosure. As shown in FIG. 7, two planes (plane 1 and plane 2) intersecting in a three-dimensional space have a common basis vector 3. A first principal angle $\theta_1$ thereof is 0, and a second principal angle $\theta_2$ thereof is equal to an included angle of the other basis vectors (basis vector 4 and basis vector 5) thereof. Therefore, a volume correlation function between the plane 1 and the plane 2 is 0.

When the basis matrix $U_s$ of the signal subspace span($U_s$) is the signal steering vector [P, Q], calculation of the volume correlation function vcc($U_s$, $U_t$) is similar to the method described above and is not described in detail in this disclosure.

Based on the foregoing analysis, it is found that the volume correlation function vcc($U_s$, $U_t$) has the following properties: When the two subspaces (the signal subspace span($U_s$) and the target subspace span($U_t$) respectively spanned by the basis matrix $U_s$ and the basis matrix $U_t$ are linearly correlated, that is, when the signal subspace span ($U_s$) and the target subspace span($U_t$) have other commonly owned basis vectors in addition to a zero vector, a sine value of at least one spatial principal angle in $\theta_1, \theta_2, ..., \theta_{min\{q,L\}}$ is 0, and the volume correlation function vcc($U_s$, $U_t$) is 0. When the two subspaces are linearly independent, that is, when the basis vectors commonly owned by the signal subspace span($U_s$) and the target subspace span($U_t$) include only the zero vector, sine values of all the spatial principal angles in $\theta_1, \theta_2, ..., \theta_{min\{q,L\}}$ are greater than 0, and the volume correlation function vcc($U_s$, $U_t$) is greater than 0. In some exemplary embodiments, when the two subspaces are orthogonal, sine values of all the spatial principal angles in $\theta_1, \theta_2, ..., \theta_{min\{q,L\}}$ are all the maximum value 1, and the volume correlation function vcc($U_s$, $U_t$) reaches the maximum value 1.

Based on the foregoing analysis, the volume correlation function vcc($U_s$, $U_t$) provides a measure for the linear correlation between the signal subspace span($U_s$) and the target subspace span($U_t$) respectively spanned by the two basis matrices $U_s$ and $U_t$. Based on this, a problem of voice activity detection for the microphone signal $x_{f,t}$ may be transformed into a problem of the volume correlation function $vcc(U_s, U_t)$ between the two basis matrices $U_s$ and $U_t$ of the signal subspace $span(U_s)$ and the target subspace span $(U_t)$ by using an inherent geometric structure between the target subspace $span(U_t)$ and the signal subspace $span(U_s)$.

S184. Determine a linear correlation coefficient r between the signal subspace $span(U_s)$ and the target subspace span $(U_t)$ based on the volume correlation function $vcc(U_s, U_t)$.

As can be learned from the definition and properties of the volume correlation function $vcc(U_s, U_t)$, if the value of the volume correlation function $vcc(U_s, U_t)$ is closer to 1, a degree of overlapping between the signal subspace $span(U_s)$ and the target subspace $span(U_t)$ is lower, orthogonality between the two subspaces is higher, and the linear correlation coefficient between the signal subspace $span(U_s)$ and the target subspace $span(U_t)$ is lower. In this case, it is more possible that the signal in the microphone signal $x_{f,t}$ is a noise signal, and these components should be suppressed as far as possible. Conversely, when the value of the volume correlation function $vcc(U_s, U_t)$ is closer to 0, the degree of overlapping between the signal subspace $span(U_s)$ and the target subspace $span(U_t)$ is higher, and the linear correlation coefficient between the signal subspace $span(U_s)$ and the target subspace $span(U_t)$ is higher. In this case, it is more possible that the target voice signal is dominant in the microphone signal $x_{f,t}$, and these components may be retained. Therefore, the linear correlation coefficient r is negatively correlated with the volume correlation function $vcc(U_s, U_t)$. Specifically, step S184 may include one of the following cases:

determining that the volume correlation function $vcc(U_s, U_t)$ is greater than a first threshold a, and determining that the linear correlation coefficient r is 0; determining that the volume correlation function $vcc(U_s, U_t)$ is less than a second threshold b, and determining that the linear correlation coefficient r is 1; and determining that the volume correlation function $vcc(U_s, U_t)$ is between the first threshold a and the second threshold b, and determining that the linear correlation coefficient r is between 0 and 1 and that the linear correlation coefficient r is a negative correlation function of the volume correlation function $vcc(U_s, U_t)$, where the second threshold b is less than the first threshold a. Specifically, the linear correlation coefficient r may be expressed as the following formula:

$$r = \begin{cases} 0 & vcc(U_s, U_t) \in [a, 1] \\ f(vcc(U_s, U_t)) & vcc(U_s, U_t) \in [b, a) \\ 1 & vcc(U_s, U_t) \in [0, b) \end{cases} \quad \text{formula (13)}$$

where $f(vcc(U_s, U_t))$ may be a function linearly negatively correlated with $vcc(U_s, U_t)$. In some exemplary embodiments, $f(vcc(U_s, U_t))$ may be expressed as the following formula:

$$f(vcc(U_s, U_t)) = \frac{1}{b-a}(vcc(U_s, U_t) - a) \quad \text{formula (14)}$$

S186. Use the linear correlation coefficient r as the voice presence probability $\lambda$, and output the voice presence probability.

In summary, in the voice activity detection system and method P100 provided in this disclosure, the computing apparatus 240 may calculate the linear correlation between the signal subspace $span(U_s)$ and the target subspace span $(U_t)$ by calculating the volume correlation function $vcc(U_s, U_t)$ of the basis matrices $U_s$ and $U_t$. If the volume correlation function $vcc(U_s, U_t)$ is higher, it proves that the linear correlation between the signal subspace $span(U_s)$ and the target subspace $span(U_t)$ is lower, and the degree of overlapping between the signal subspace $span(U_s)$ and the target subspace $span(U_t)$ is lower. In this case, in other words, the degree of overlapping between the microphone signal $x_{f,t}$ and the target voice signal is lower. In this case, the voice presence probability $\lambda$ of the target voice signal being present in the microphone signal $x_{f,t}$ is lower. If the volume correlation function $vcc(U_s, U_t)$ is lower, it proves that the linear correlation between the signal subspace $span(U_s)$ and the target subspace $span(U_t)$ is higher, and the degree of overlapping between the signal subspace $span(U_s)$ and the target subspace $span(U_t)$ is higher. In this case, in other words, the degree of overlapping between the microphone signal $x_{f,t}$ and the target voice signal is higher. In this case, the voice presence probability $\lambda$ of the target voice signal being present in the microphone signal $x_{f,t}$ is higher. The voice activity detection system and method P100 provided in this disclosure may improve accuracy of voice activity detection and the voice enhancement effect.

This disclosure further provides a voice enhancement system. The voice enhancement system may also be applied to an electronic device 200. In some exemplary embodiments, the voice enhancement system may include a computing apparatus 240. In some exemplary embodiments, the voice enhancement system may be applied to the computing apparatus 240. In other words, the voice enhancement system may operate on the computing apparatus 240. The voice enhancement system may include a hardware device having a data information processing function and a program required to drive the hardware device to work. Certainly, the voice enhancement system may also be only a hardware device having a data processing capability or only a program running in a hardware device.

The voice enhancement system may store data or an instruction for performing a voice enhancement method described in this disclosure and may execute the data and/or the instruction. When the voice enhancement system operates on the computing apparatus 240, the voice enhancement system may obtain a microphone signal from a microphone array 220 based on a communication and execute the data or the instruction of the voice enhancement method described in this disclosure. The voice enhancement method is described in other parts of this disclosure. For example, the voice enhancement method is described in the description of FIG. 8.

When operating on the computing apparatus 240, the voice enhancement system is in communication with the microphone array 220. A storage medium 243 may further include at least one instruction set stored in a data storage apparatus and used for performing voice enhancement calculation on the microphone signal. The instruction may be computer program code. The computer program code may include a program, a routine, an object, a component, a data structure, a process, a module, or the like for performing the voice enhancement method provided in this disclosure. A processor 242 may read the at least one instruction set and perform, based on the at least one instruction set, the voice enhancement method provided in this disclosure. The processor 242 may perform all steps included in the voice enhancement method.

Figure 8:
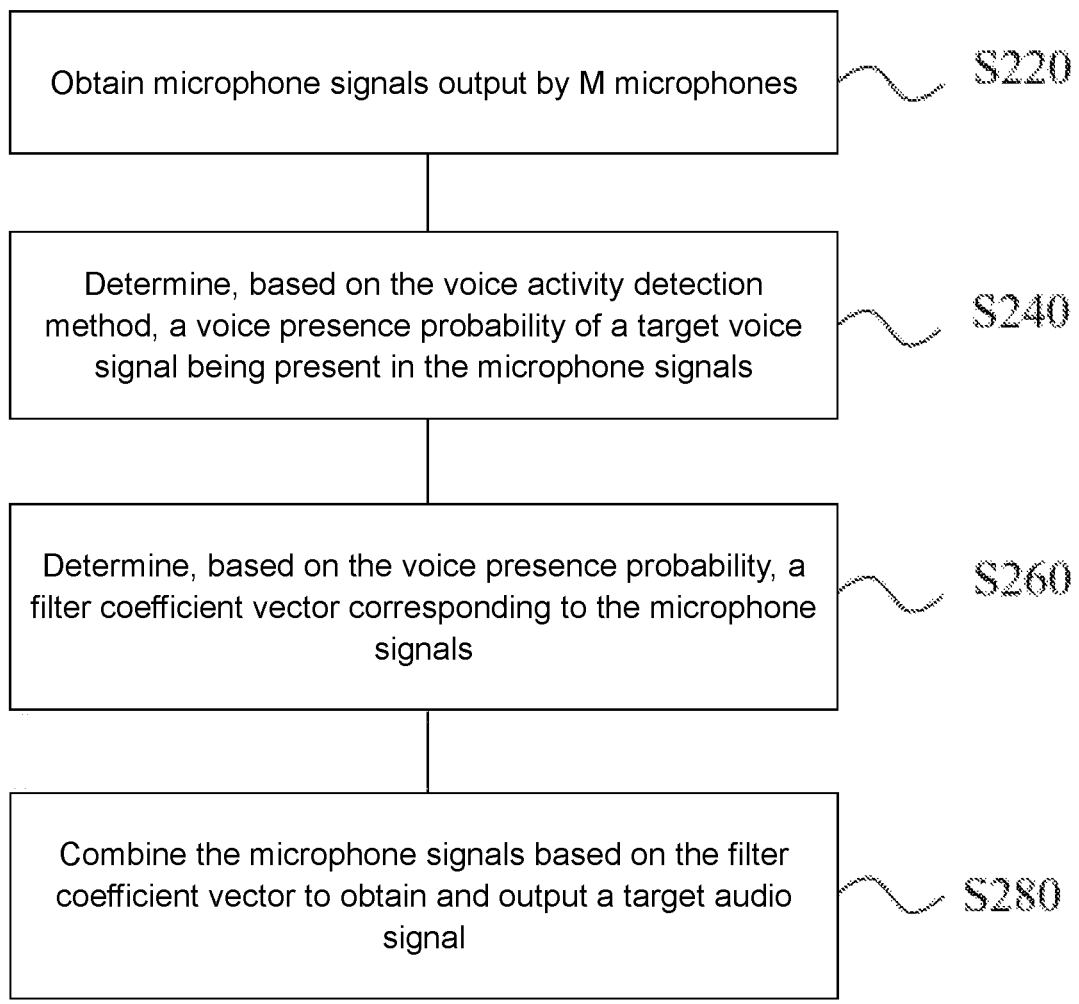
FIG. 8 is a flowchart of a voice enhancement method according to some exemplary embodiments of this disclosure.

FIG. 8 is a flowchart of a voice enhancement method P200 according to some exemplary embodiments of this disclosure. The method P200 may perform voice enhancement on a microphone signal. Specifically, a processor 242 may perform the method P200. As shown in FIG. 8, the method P200 may include the following steps.

S220. Obtain microphone signals $x_{f,t}$ output by M microphones.

This step is the same as step S120, and is not described herein again.

S240. Determine, based on the voice activity detection method P100, a voice presence probability $\lambda$ of a target voice signal being present in the microphone signals $x_{f,t}$.

S260. Determine, based on the voice presence probability $\lambda$, a filter coefficient vector $\omega_{f,t}$ corresponding to the microphone signals $x_{f,t}$.

The filter coefficient vector $\omega_{f,t}$ may be an M×1-dimensional vector. The filter coefficient vector $\omega_{f,t}$ may be expressed as the following formula:

$$\omega_{f,t}=[\omega_{1,f,t},\omega_{2,f,t},\ldots,\omega_{M,f,t}]^H \quad \text{formula (15)}$$

where a filter coefficient corresponding to an mth microphone 222 is $\omega_{m,f,t}$, and m=1, 2, ..., M.

In some exemplary embodiments, a computing apparatus 240 may determine the filter coefficient vector $\omega_{f,t}$ based on an MVDR method. Specifically, step S260 may include: determining noise covariance matrices $M_{f,t}^n$ of the microphone signals $x_{f,t}$ based on the voice presence probability $\lambda$; and determining the filter coefficient vector $\omega_{f,t}$ based on the MVDR method and the noise covariance matrices $M_{f,t}^n$. The noise covariance matrix $M_{f,t}^n$ may be expressed as the following formula:

$$M_{f,t}^n = \frac{1}{\sum_t (1-\lambda)} \sum_t (1-\lambda) x_{f,t} x_{f,t}^H \quad \text{formula (16)}$$

The filter coefficient vector $\omega_{f,t}$ may be expressed as the following formula:

$$\omega_{f,t} = \frac{M_{f,t}^{n\ -1} P}{P^H M_{f,t}^{n\ -1} P} \quad \text{formula (17)}$$

where P is a preset target steering vector.

In some exemplary embodiments, the computing apparatus 240 may determine the filter coefficient vector $\omega_{f,t}$ based on a fixed beam method. Specifically, step S260 may include: using the voice presence probability $\lambda$ as a filter coefficient $\omega_{k,f,t}$ corresponding to a target microphone signal $x_{k,f,t}$ in the microphone signals $x_{f,t}$; and determining that filter coefficients corresponding to other microphone signals than the target microphone signal $x_{k,f,t}$ in the microphone signals $x_{f,t}$ are 0, where k=1, 2, ..., M. The filter coefficient vector $\omega_{f,t}$ includes a vector formed by the filter coefficient $\omega_{k,f,t}$ corresponding to the target microphone signal $x_{k,f,t}$ and the filter coefficients corresponding to the other microphone signals. The filter coefficient vector $\omega_{f,t}$ may be expressed as the following formula:

$$\omega f,t=[0,0,\ldots,\omega_{k,f,t}=\lambda,\ldots,0]^H \quad \text{formula (18)}$$

In some exemplary embodiments, the target microphone signal $x_{k,f,t}$ may include one of the microphone signals $x_{f,t}$ that has a highest signal-to-noise ratio. In some exemplary embodiments, the target microphone signal $x_{k,f,t}$ may be a microphone signal closest to a target voice signal source (such as a mouth). In some exemplary embodiments, k may be prestored in the computing apparatus 240.

S280. Combine the microphone signals $x_{f,t}$ based on the filter coefficient vector soft to obtain and output a target audio signal $y_{f,t}$.

The target audio signal $y_{f,t}$ may be expressed as the following formula:

$$y_{f,t}=\omega_{f,t}^H x_{f,t} \quad \text{formula (21)}$$

In summary, the voice activity detection system and method P100, and the voice enhancement system and method P200 provided in this disclosure are used for the microphone array 220 formed by a plurality of microphones 222. The voice activity detection system and method P100, and the voice enhancement system and method P200 may obtain the microphone signal $x_{f,t}$ captured by the microphone array 220. The microphone signal $x_{f,t}$ may include a noise signal, and may also include a target voice signal. The target voice signal and the noise signal are two non-overlapping signals. A target subspace span($U_t$) in which the target voice signal is located and a noise subspace in which the noise signal is located are two non-overlapping subspaces. When the target voice signal is absent in the microphone signal $x_{f,t}$, the microphone signal $x_{f,t}$ includes only the noise signal. In this case, a signal subspace span($U_s$) in which the microphone signal $x_{f,t}$ is located and the target subspace span($U_t$) in which the target voice signal is located are two non-overlapping subspaces, and a linear correlation between the signal subspace span($U_s$) and the target subspace span($U_t$) is low. When the target voice signal is present in the microphone signal $x_{f,t}$, the microphone signal $x_{f,t}$ includes both the target voice signal and the noise signal. In this case, the signal subspace span($U_s$) in which the microphone signal $x_{f,t}$ is located and the target subspace span($U_t$) in which the target voice signal is located are two overlapping subspaces, and the linear correlation between the signal subspace span($U_s$) and the target subspace span($U_t$) is high. Therefore, by calculating the linear correlation between the signal subspace span($U_s$) in which the microphone signal $x_{f,t}$ is located and the target subspace span($U_t$) in which the target voice signal is located, the voice activity detection method P100 and system provided in this disclosure may determine a voice presence probability $\lambda$ of the target voice signal being present in the microphone signal $x_{f,t}$. The voice enhancement method P200 and system may calculate a filter coefficient vector $\omega_{f,t}$ based on the voice presence probability $\lambda$ to perform voice enhancement on the microphone signal $x_{f,t}$. In summary, the voice activity detection system and method P100, and the voice enhancement system and method P200 may improve calculation precision of the voice presence probability $\lambda$ and further improve a voice enhancement effect.

Another aspect of this disclosure provides a non-transitory storage medium. The non-transitory storage medium stores at least one set of executable instructions for voice activity detection, and when the executable instructions are executed by a processor, the executable instructions instruct the processor to implement steps of the voice activity detection method P100 described in this disclosure. In some possible implementations, each aspect of this disclosure may be further implemented in a form of a program product, where the program product includes program code. When the program product operates on a computing device (for example, the computing apparatus 240), the program code may be used to enable the computing device to perform steps of voice activity detection described in this disclosure. The program product for implementing the foregoing method may use a portable compact disc read-only memory (CD-ROM) including program code, and may run on the computing device. However, the program product in this disclosure is not limited thereto. In this disclosure, a readable storage medium may be any tangible medium containing or storing a program, and the program may be used by or in connection with an instruction execution system (for example, the processor 242). The program product may use any combination of one or more readable media. The readable medium may be a readable signal medium or a readable storage medium. For example, the readable storage medium may be but is not limited to an electronic, magnetic, optical, electromagnetic, infrared, or semi-conductor system, apparatus, or device, or any combination thereof. More specific examples of the readable storage medium include: an electrical connection having one or more conducting wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. The computer-readable storage medium may include a data signal propagated in a baseband or as part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program to be used by or in combination with an instruction execution system, apparatus, or device. The program code contained in the readable storage medium may be transmitted by using any appropriate medium, including but not limited to wireless, wired, optical cable, RF, or the like, or any appropriate combination thereof. The program code for performing operations in this disclosure may be compiled in any combination of one or more programming languages. The programming languages include object-oriented programming languages such as Java and C++, and further include conventional procedural programming languages such as a "C" language or a similar programming language. The program code may be fully executed on the computing device, partially executed on the computing device, executed as an independent software package, partially executed on the computing device and partially executed on a remote computing device, or fully executed on a remote computing device.

Specific embodiments of this disclosure have been described above. Other embodiments also fall within the scope of the appended claims. In some cases, actions or steps described in the claims may be performed in an order different from orders in the embodiments and still achieve expected results. In addition, the processes depicted in the drawings do not necessarily require a specific order or sequence to achieve the expected results. In some implementations, multitask processing and parallel processing are also possible or may be advantageous.

In summary, after reading this detailed disclosure, a person skilled in the art may understand that the foregoing detailed disclosure is illustrative, rather than restrictive. A person skilled in the art may understand that this disclosure is intended to cover various reasonable changes, improvements, and modifications to the embodiments, although this is not stated herein. These changes, improvements, and modifications are intended to be made in this disclosure and are within the spirit and scope of this disclosure.

In addition, some terms in this disclosure have been used to describe the embodiments of this disclosure. For example, "one embodiment", "an embodiment", and/or "some embodiments" mean/means that a specific feature, structure, or characteristic described with reference to the embodiment(s) may be included in at least one embodiment of this disclosure. Therefore, it can be emphasized and should be understood that in various parts of this disclosure, two or more references to "an embodiment" or "one embodiment" or "an alternative embodiment" do not necessarily all refer to the same embodiment. Further, specific features, structures, or characteristics may be appropriately combined in one or more embodiments of this disclosure.

It should be understood that in the foregoing description of the embodiments of this disclosure, to help understand one feature and for the purpose of simplifying this disclosure, various features in this disclosure are combined in a single embodiment, single drawing, or description thereof. However, this does not mean that the combination of these features is necessary. It is entirely possible for a person skilled in the art to extract some of the features as a separate embodiment for understanding when reading this disclosure. In other words, an embodiment of this disclosure may also be understood as the integration of a plurality of sub-embodiments. It is also true when content of each sub-embodiment is less than all features of a single embodiment disclosed above.

Each patent, patent application, patent application publication, and other materials cited herein, such as articles, books, disclosures, publications, documents, and materials, can be incorporated herein by reference, which are applicable to all content used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistency or conflict in descriptions, definitions, and/or use of a term associated with this document and descriptions, definitions, and/or use of the term associated with any material, the term in this document shall prevail.

Finally, it should be understood that the implementation solutions disclosed herein illustrate the principles of the implementation solutions of this disclosure. Other modified embodiments also fall within the scope of this disclosure. Therefore, the embodiments disclosed in this disclosure are merely exemplary and not restrictive. A person skilled in the art may use alternative configurations to implement the present disclosure according to the embodiments of the present disclosure. Therefore, the embodiments of this disclosure are not limited to those specific embodiments specifically described herein.

What is claimed is:

1. A voice activity detection system, comprising:
at least one non-transitory storage medium storing a set of instructions for voice activity detection; and
at least one processor in communication with the at least one non-transitory storage medium, wherein during an operation of voice activity detection for M microphones distributed in a preset array shape, wherein M is an integer greater than 1, the at least one processor executes the set of instructions to:
obtain microphone signals output by the M microphones, determine, based on the microphone signals, a signal subspace formed by the microphone signals, determine a target subspace formed by a target voice signal, determine, based on a volume correlation between the signal subspace and the target subspace, a linear correlation coefficient between the signal subspace and the target subspace; and use the linear correlation coefficient as a voice presence probability of the target voice signal being present in the microphone signals, and output the voice presence probability.

2. The voice activity detection system according to claim 1, wherein to determine, based on the microphone signals, the signal subspace formed by the microphone signal, the at least one processor executes the set of instructions to:

determine a sample covariance matrix of the microphone signals based on the microphone signals;

perform eigendecomposition on the sample covariance matrix to determine a plurality of eigenvectors of the sample covariance matrix; and use a matrix formed by at least some eigenvectors of the plurality of eigenvectors as a basis matrix of the signal subspace.

3. The voice activity detection system according to claim 1, wherein to determine, based on the microphone signals, the signal subspace formed by the microphone signals, the at least one processor executes the set of instructions to:

determine a signal steering vector of the microphone signals by determining an azimuth of a signal source of the microphone signals based on the microphone signals by using a spatial estimation method, wherein the spatial estimation method includes at least one of a direction of arrival (DOA) estimation method, or a spatial spectrum estimation method; and determine that the signal steering vector is a basis matrix of the signal subspace.

4. The voice activity detection system according to claim 1, wherein to determine the target subspace formed by the target voice signal, the at least one processor executes the set of instructions to:

determine that a preset target steering vector corresponding to the target voice signal is a basis matrix of the target subspace.

5. The voice activity detection system according to claim 1, wherein to determine, based on a volume correlation between the signal subspace and the target subspace, a linear correlation coefficient between the signal subspace and the target subspace, the at least one processor executes the set of instructions to:

determine a volume correlation function between the signal subspace and the target subspace; and determine the linear correlation coefficient between the signal subspace and the target subspace based on the volume correlation function, wherein the linear correlation coefficient is negatively correlated with the volume correlation function.

6. The voice activity detection system according to claim 5, wherein to determine the linear correlation coefficient between the signal subspace and the target subspace based on the volume correlation function, the at least one processor executes the set of instructions to perform of the following steps:

determining that the volume correlation function is greater than a first threshold, and determining that the linear correlation coefficient is 0;

determining that the volume correlation function is less than a second threshold, and determining that the linear correlation coefficient is 1, wherein the second threshold is less than the first threshold; and determining that the volume correlation function is between the first threshold and the second threshold, and determining that the linear correlation coefficient is between 0 and 1 and that the linear correlation coefficient is a negative correlation function of the volume correlation function.

7. A voice activity detection method for M microphones distributed in a preset array shape, wherein M is an integer greater than 1, the voice activity detection method comprising:

obtaining microphone signals output by the M microphones;

determining, based on the microphone signals, a signal subspace formed by the microphone signals;

determining a target subspace formed by a target voice signal;

determining, based on a volume correlation between the signal subspace and the target subspace, a linear correlation coefficient between the signal subspace and the target subspace; and using the linear correlation coefficient as a voice presence probability of the target voice signal being present in the microphone signals, and outputting the voice presence probability.

8. The voice activity detection method according to claim 7, wherein the determining, based on a volume correlation between the signal subspace and the target subspace, a linear correlation coefficient between the signal subspace and the target subspace include:

determining a volume correlation function between the signal subspace and the target subspace; and determining the linear correlation coefficient between the signal subspace and the target subspace based on the volume correlation function, wherein the linear correlation coefficient is negatively correlated with the volume correlation function.

9. The voice activity detection method according to claim 8, wherein the determining of the linear correlation coefficient between the signal subspace and the target subspace based on the volume correlation function includes one of the following steps:

determining that the volume correlation function is greater than a first threshold, and determining that the linear correlation coefficient is 0;

determining that the volume correlation function is less than a second threshold, and determining that the linear correlation coefficient is 1, wherein the second threshold is less than the first threshold; and determining that the volume correlation function is between the first threshold and the second threshold, and determining that the linear correlation coefficient is between 0 and 1 and that the linear correlation coefficient is a negative correlation function of the volume correlation function.

10. A voice enhancement system, comprising:

at least non-transitory one storage medium storing a set of instructions for voice enhancement; and at least one processor in communication with the at least one non-transitory storage medium, wherein during an operation of voice enhancement for M microphones distributed in a preset array shape, wherein M is an integer greater than 1, the at least one processor executes the set of instructions to:

obtain microphone signals output by the M microphones, determine a voice presence probability of a target voice signal being present in the microphone signals, determine, based on the voice presence probability, filter coefficient vectors corresponding to the microphone signals, and combine the microphone signals based on the filter coefficient vectors to obtain a target audio signal and output the target audio signal, wherein to determine the voice presence probability of the target voice signal being present in the microphone signals, the at least one processor executes the set of instructions to:

determine, based on the microphone signals, a signal subspace formed by the microphone signals, determine a target subspace formed by a target voice signal, and determine, based on a linear correlation between the signal subspace and the target subspace, the voice presence probability of the target voice signal being present in the microphone signals, and output the voice presence probability.

11. The voice enhancement system according to claim 10, wherein to determine, based on the microphone signals, the signal subspace formed by the microphone signal, the at least one processor executes the set of instructions to:

determine a sample covariance matrix of the microphone signals based on the microphone signals;

perform eigendecomposition on the sample covariance matrix to determine a plurality of eigenvectors of the sample covariance matrix; and use a matrix formed by at least some eigenvectors of the plurality of eigenvectors as a basis matrix of the signal subspace.

12. The voice enhancement system according to claim 10, wherein to determine, based on the microphone signals, the signal subspace formed by the microphone signals, the at least one processor executes the set of instructions to:

determine a signal steering vector of the microphone signals by determining an azimuth of a signal source of the microphone signals based on the microphone signals by using a spatial estimation method, wherein the spatial estimation method includes at least one of a direction of arrival (DOA) estimation method, or a spatial spectrum estimation method; and determine that the signal steering vector is a basis matrix of the signal subspace.

13. The voice enhancement system according to claim 10, wherein to determine the target subspace formed by the target voice signal, the at least one processor executes the set of instructions to:

determine that a preset target steering vector corresponding to the target voice signal is a basis matrix of the target subspace.

14. The voice enhancement system according to claim 10, wherein to determine, based on the linear correlation between the signal subspace and the target subspace, the voice presence probability of the target voice signal being present in the microphone signal and output the voice presence probability, the at least one processor executes the set of instructions to:

determine a volume correlation function between the signal subspace and the target subspace;

determine a linear correlation coefficient between the signal subspace and the target subspace based on the volume correlation function, wherein the linear correlation coefficient is negatively correlated with the volume correlation function; and use the linear correlation coefficient as the voice presence probability, and output the voice presence probability.

15. The voice enhancement system according to claim 14, wherein to determine the linear correlation coefficient between the signal subspace and the target subspace based on the volume correlation function, the at least one processor executes the set of instructions to perform of the following steps:

determining that the volume correlation function is greater than a first threshold, and determining that the linear correlation coefficient is 0;

determining that the volume correlation function is less than a second threshold, and determining that the linear correlation coefficient is 1, wherein the second threshold is less than the first threshold; and determining that the volume correlation function is between the first threshold and the second threshold, and determining that the linear correlation coefficient is between 0 and 1 and that the linear correlation coefficient is a negative correlation function of the volume correlation function.

16. The voice enhancement system according to claim 10, wherein to determine, based on the voice presence probability, the filter coefficient vectors corresponding to the microphone signals, the at least one processor executes the set of instructions to:

determine noise covariance matrices of the microphone signals based on the voice presence probability; and determine the filter coefficient vectors based on a minimum variance distortionless response (MVDR) method and the noise covariance matrices.

17. The voice enhancement system according to claim 10, wherein to determine, based on the voice presence probability, the filter coefficient vectors corresponding to the microphone signals, the at least one processor executes the set of instructions to:

use the voice presence probability as a filter coefficient corresponding to a target microphone signal of the microphone signals, wherein the target microphone signal includes one of the microphone signals that has a highest signal-to-noise ratio; and determine that filter coefficients corresponding to other microphone signals than the target microphone signal among the microphone signals are 0, wherein the filter coefficient vectors include vectors formed by the filter coefficient corresponding to the target microphone signal and the filter coefficients corresponding to the other microphone signals.

18. A voice enhancement method for M microphones distributed in a preset array shape, wherein M is an integer greater than 1, the voice enhancement method comprising:

obtaining microphone signals output by the M microphones;

determining a voice presence probability of a target voice signal being present in the microphone signals;

determining, based on the voice presence probability, filter coefficient vectors corresponding to the microphone signals; and combining the microphone signals based on the filter coefficient vectors to obtain a target audio signal and outputting the target audio signal, wherein the determining of the voice presence probability of the target voice signal being present in the microphone signals includes:

determining, based on the microphone signals, a signal subspace formed by the microphone signals, determining a target subspace formed by a target voice signal, and determining, based on a linear correlation between the signal subspace and the target subspace, the voice presence probability of the target voice signal being present in the microphone signals, and outputting the voice presence probability.

19. The voice enhancement method according to claim 18, wherein the determining, based on the voice presence probability, the filter coefficient vectors corresponding to the microphone signals includes:

determining noise covariance matrices of the microphone signals based on the voice presence probability; and determining the filter coefficient vectors based on a minimum variance distortionless response (MVDR) method and the noise covariance matrices.

20. The voice enhancement method according to claim 18, wherein the determining, based on the voice presence probability, the filter coefficient vectors corresponding to the microphone signals includes:

using the voice presence probability as a filter coefficient corresponding to a target microphone signal of the microphone signals, wherein the target microphone signal includes one of the microphone signals that has a highest signal-to-noise ratio; and determining that filter coefficients corresponding to other microphone signals than the target microphone signal among the microphone signals are 0, wherein the filter coefficient vectors include vectors formed by the filter coefficient corresponding to the target microphone signal and the filter coefficients corresponding to the other microphone signals.

* * * * *